July 8, 1969

L. W. WELLS 3,454,333

FILM CARTRIDGE HOLDER

Filed March 30, 1967

INVENTOR.
LEON W. WELLS
BY
*Lyon & Lyon*
ATTORNEYS

United States Patent Office 3,454,333
Patented July 8, 1969

3,454,333
FILM CARTRIDGE HOLDER
Leon W. Wells, Closter, N.J., assignor to Panopix Research Inc., New York, N.Y., a corporation of New York
Filed Mar. 30, 1967, Ser. No. 627,010
Int. Cl. G03b 23/02
U.S. Cl. 352—72         8 Claims

ABSTRACT OF THE DISCLOSURE

A film cartridge holder for a projection machine having a cartridge receiving compartment with a cover and a latch therefore, with means responsive to completion of a projection cycle for releasing the latch. The latch itself and the means for releasing it are inaccessible to manual operation when there is a film cartridge in the compartment and the cover is in the closed position. There is an external manually operable member for releasing the cover which is operable only when the compartment is empty, there being blocking means preventing its operation when a film cartridge is present in the compartment.

CROSS REFERENCES TO RELATED APPLICATIONS

This application relates to improvements in a motion picture projector of the type disclosed in my prior application Ser. No. 541,196, filed Apr. 8, 1966, and involves features adapted a projector of that type for use with a film cartridge of the kind disclosed in my application Ser. No. 621,259 filed Mar. 7, 1967.

BACKGROUND OF THE INVENTION

The motion picture projector shown in my application Ser. No. 541,196 is for projecting film having thereon a multiplicity of rows of picture frames and sound tracks. The film handling mechanisms are mounted on a vertically movable platform that is initially positioned relative to the particular system to project a first row of picture frames with the film moving in one direction. At the end of that row signal means on the film cause the platform to move vertically, laterally of the length of film, to align the next adjacent row of frames with the optical system and the drive means are then reversed to project the said next row, with the film moving in the opposite direction. This sequence of operation is continued until all rows have been projected. At completion of projection of the last row of picture frames the film is always moving in a direction to wind the same back into a film cartridge, and as the end of the film reaches the cartridge, a projection on the film actuates switch means to effect return of the platform to its starting position and subsequent deenergization of the entire machine.

As shown in prior application Ser. No. 541,196, the film is provided in a removable magazine that can be positioned on the platform in engagement with suitable positioning means and an electrically operable latch is employed to directly engage and lock the cartridge in position until a complete cycle of projection has been completed. This locking of the cartridge is for the purpose of preventing inadvertent removal of the cartridge from the machine at a time when any film extends therefrom into the transport mechanism on the platform. The automatically operable latch does not release until a cycle of projection has been completed and all film withdrawn back into the carriage. The present invention involves improvements in the above described safety feature and, particularly for use with a cartridge of the type shown in my prior application Ser. No. 621,259.

SUMMARY OF THE INVENTION

The present application relates to an arrangement for preventing inadvertent removal of a film cartridge from a projection machine of the type heretofore referred to and wherein the machine includes a compartment adapted to receive the film cartridge. The compartment is provided with a movable closure which, when closed, renders the cartridge inaccessible for removal. A latch holds the cover in closed condition, but is automatically retracted at the end of a projection cycle whereupon the cover, which is spring biased, opens to permit withdrawal of the same from the compartment. Manual means are also provided for releasing the latch but a blocking arrangement prevents actuation of the manual means when a film cartridge is present in the compartment. Thus, it can be opened only by automatic operation and the manual means is available only for the purpose of opening the compartment cover when the latter is empty, to permit placing a cartridge in position. The blocking feature resides in the extension on a manually movable member which must move into the compartment before the member can be actuated to release the latch. When a cartridge is present in the compartment, such movement cannot take place. The invention further includes cooperating features between the film cartridge and the machine whereupon the final cycling to release the latch cannot take place until the film has been withdrawn into the cartridge, at which time a film actuated element closes a switch to initiate the final resetting cycle of the machine.

DESCRIPTION OF THE PREFERRED EMBODIMENT

Figure 1:
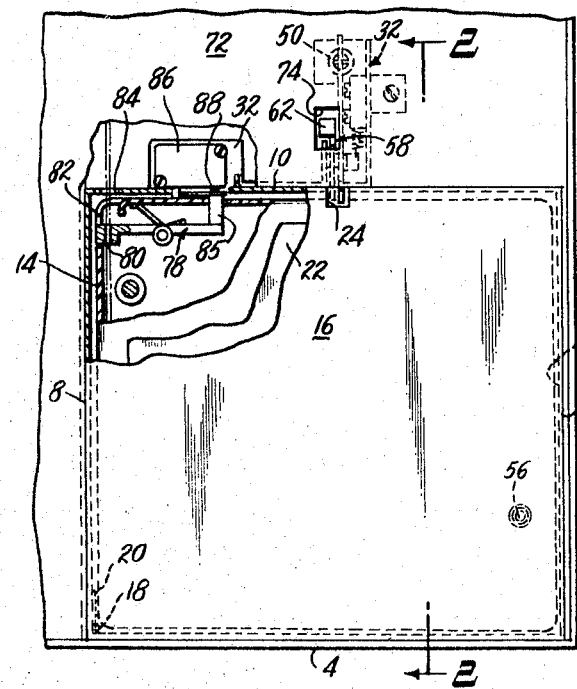
FIG. 1 is a fragmentary top plan view, partly in section, of the film cartridge holder of the present invention with a cartridge therein.

In the drawings, numeral 2 identifies a vertical movable platform upon which film transport and drive mechanisms are mounted (not shown) and which may be of the type fully shown and described in my application Ser. No. 541,196. On the platform 2, wall means 4, 6, 8 and 10, along with a portion of the platform itself define an upwardly open compartment 12 of a size and configuration to receive a film cartridge 14 of the type described in my applicaiton Ser. No. 621,259. The open top of the compartment 12 is provided with a hinged cover 16, pivoted as at 18 to the side walls 6 and 8. A suitable biasing spring 20 is provided which normally biases the cover 16 to an open position. The inner surface of the cover 16 is provided with a layer of cushioning material 22 thereon, such as a suitable plastic or rubber sponge-like material of sufficient thickness to bear upon the cartridge 14 and hold the same firmly in place even in the presence of vibration or other forces.

The free or forward edges of the cover 16 is provided with a recess 24 serving to receive the nose 26 of a latch 28.

Figure 2:
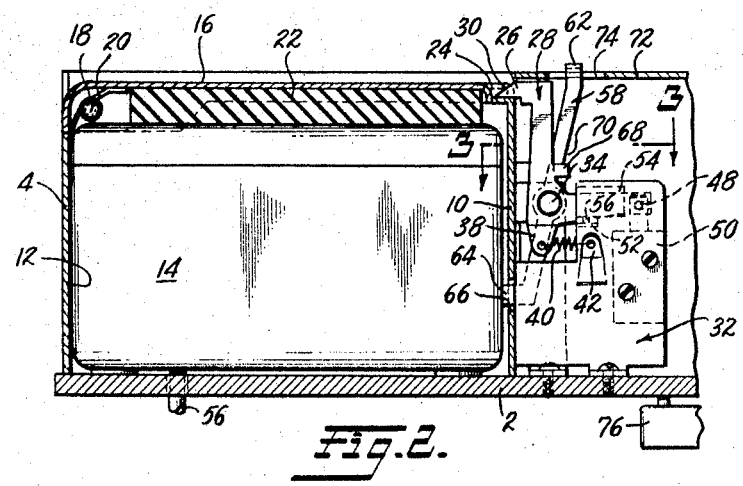
FIG. 2 is a vertical sectional view taken substantially on the line 2—2 of FIG. 1.

As will be further described, the latch 28 is biased to position shown in FIG. 2 to hold the cover 16 closed. The upper portion 30 of the nose 26 is bevelled so that mere closure of the cover 16 will cam the latch to the right to permit the edge of the cover to move therepast whereupon the latch will then snap into the cover holding position shown.

Figure 4:
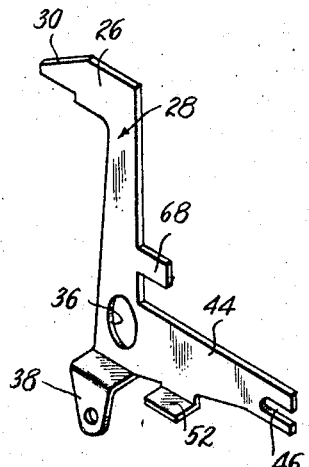
FIG. 4 is an enlarged perspective view of the cover latch of the holding mechanism; and, FIG. 5 is an enlarged perspective view of the manual release arm.

A suitable bracket 32 is mounted on the platfrom 2 adjacent compartment 12 and serves to support a pivot pin 34 upon which the latch 28 is pivotally mounted. FIG. 4 shows the structure of the latch 28 in greater detail and in which the opening 36 is provided to embrace the pivot pin 34. An offset perforated ear 38 depends below the pivot pin 34 and a suitable tension spring 40 engages the perforation in ear 38 and has its other end secured to an ear 42 struck from the bracket 32. Thus, the spring 40 applies a constant bias to the latch 28 tending to hold it in the cover holding position shown. The latch 28 is also provided with a rearwardly extending arm 44 having a notch 46 therein engageable by a driving pin 48 of solenoid 50. The solenoid 50 is also mounted on the bracket 32 and is arranged so that energization thereof will draw its pin 48 downwardly to thus forcibly retract the latch 28 from its holding position. Extending laterally from a lower edge of the arm 44 is a flange or ear 52 in position to engage an actuator button on a switch 54, also mounted on the bracket 32 adjacent the arm 44. The switch 54 is normally open and is connected in a starting circuit for the projection machine. When the latch 28 is in a retracted position, the switch 54 is opened and the machine cannot be energized. However, when the latch is in its cover-holding position shown, flange 52 closes switch 54 and thus conditions the starting circuit so that subsequent actuation of a starting button, not shown, will be effective to start the machine provided a cartridge 14 is present in the compartment. Schmatically shown in FIG. 2 is a plunger 56 held in its depressed position by the cartridge 14. If no cartridge is present in the compartment 12, the plunger 56 rises to an upper position in which mechanism associated therewith physically prevents actuation of the starting button referred to. This feature, however, is not a part of the present invention and will not be described in any further detail.

Figure 5:
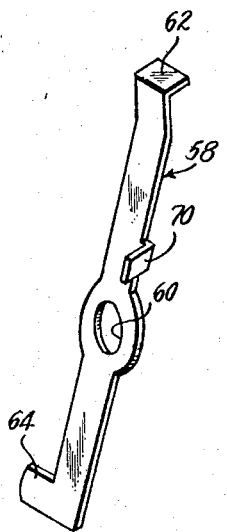
Figure 3:
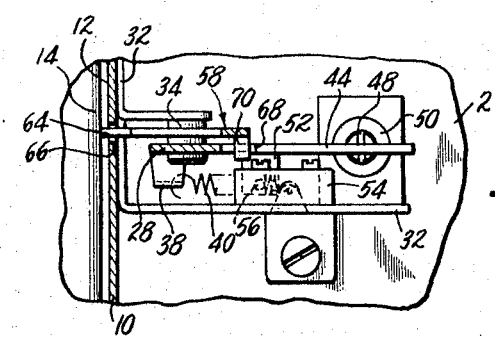
FIG. 3 is an enlarged fragmentary horizontal sectional view taken on the line 3—3 of FIG. 2.

Also mounted for pivotal movement on the pivot pin 34 is a manually actuable member 58, shown in detail in FIG. 5, and which is in the form of an elongated lever having an opening 60 through an intermediate portion and by which it is pivotally mounted on the pin 34 for pivotal movement thereon independently of the pivotal movement of latch 28. The upper end of the lever terminates in a handle feature 62 adapted to be manually engaged and actuated in a manner to be described. The lower end of the member 58 extends downwardly from the pin 34 and terminates in a forwardly extending blocking projection 64. As shown in FIG. 2, the compartment wall 10 is provided with an opening 66 in alignment with the path of pivotal movement of projection 64 so that the latter can project therethrough into the compartment 12.

Extending rearwardly from the latch 28 and above the arm 44 is a short abutment 68 and extending laterally from the manually operable member 58 is a narrow flange or ear 70 arranged to extend over the abutment 68 on the latch. As shown in FIG. 2, it will be clearly evident that latch 28 may be swung clockwise to release the cover 16 without any pivotal movement being imparted to manual member 58. Also, as shown in FIG. 2, the manually operable lever 58 is in such position that its blocking projection 64 engages a side of the cartridge 14 in compartment 12 and thus the member is restrained against clockwise pivotal movement, and it is thus impossible to release the latch 28 by means of the manually operable member as long as a cartridge is in the compartment. The projection machine is also provided with suitable cover wall means 72 enclosing the latch 28 and solenoid 50 to thereby render them inaccessible to manual actuation. However, the manually actuable lever extends upwardly through a slot 74, in the wall member so that its handle feature 62 is readily accessible for manual actuation.

As shown diagrammatically at 76, in FIG. 2, the projection machine is provided with a switch fixed thereon and which is engaged and actuated by the platform 2 when the latter has been pulled downwardly to its lowest or starting position after completion of a projection cycle. The switch 76, in addition to performing other functions not described herein, supplies current to solenoid 50 to energize the same.

Reference is made to my prior application Ser. No. 621,259 for a detailed description of the cartridge 14. As described therein, the cartridge is provided with a movable gate member 78 having a slot 80 through which the film moves. From the slot 80, film can be projected through a slot 82 in the cartridge wall, which is aligned with a slot 84 in a compartment wall 10, thus permitting movement of film between the exterior of the compartment and the interior of the cartridge.

As also described in the adjacent prior application, the film is provided with suitable means at its free end, and when the film is withdrawn into the cartridge it engages and swings gate 78 to project a finger 85 outwardly of the cartridge. Mounted on an extension of the bracket 32 is a further switch 86 so positioned that its actuating button 88 is in position to be engaged and actuated by finger 85 when the latter is projected outwardly of the cartridge 14.

In operation, assume first that the compartment 12 is empty and its cover 16 is closed and being held closed by latch 28. The projection machine is at that time conditioned for the starting of a projection cycle and platform 2 will then be in its lower position engaging switch 76, as shown. To commence operation of the machine, the manually operable lever 58 is actuated to swing clockwise, as seen in FIG. 2. Since the compartment 12 is empty, the blocking projection 64 can move freely into the compartment, permitting sufficient pivotal movement of member 58 to cause ear 70 thereon to engage abutment 68 on the latch 28 and thereby forcibly swing the latch clockwise to a release position whereupon spring 20 causes cover 16 to open. Release of the handle portion 62 then permits the latch 28 to return to the position shown in FIG. 2, but the cover 16 is at this time open. However, the latch should be held open until the cartridge is in place. The operator then places the cartridge 14 into the compartment 12, orienting the same in the relation shown in FIG. 1. The cover 16 is then manually moved to its closed position, the latch 28, if released at this time, resiliently camming out of the way to permit such closure and then returning to its holding position to hold the cover closed as shown. With the cartridge now in the compartment, the manually operable lever 58 cannot be actuated to release the latch since the cartridge will prevent inward movement of blocking projection 64. With the cartridge in place, plunger 56 is held depressed, thus permitting actuation of a starting button, and the ear 52 on the latch has now closed switch 54 so that the starting circuit is conditioned for completion. When the projection machine has been started, it will continue to run until all rows have been projected, as described in my Ser. No. 541,196. Shortly after completion of projection of the last row of picture frames, the end of the film having the aforementioned means thereon, engages pivoted gate 78 and swings finger 85 outwardly to close switch 86. Closure of switch 86, as described in Ser. No. 541,196, initiates a terminal cycle wherein a motor forcibly pulls the platform 2 downwardly for the start of a completely new cycle of operation. When the platform reaches the lower position shown in FIG. 2, it closes switch 76 and solenoid 50 is thereupon energized and will retract latch 28, as already described to release the cover 16, which then opens under the influence of spring 20 and the machine is then stopped automatically and the cartridge 14 may be removed for replacement or otherwise.

While a single specific embodiment of the invention

I claim:

1. A film cartridge holder for a projection machine, comprising: wall means defining an open, cartridge-receiving compartment; a movable cover for closing said open compartment; a latch for holding said cover in closed position; operating means automatically operable in response to a predetermined function of said projection machine for releasing said latch; a manually operable member, movable independently of said latch, and being operable to release said latch, and disabling means responsive to the presence of a film cartridge in said compartment for disabling said manually operable member from releasing said latch.

2. A holder as defined in claim 1 wherein said cover is hinged to said wall means; and spring means biasing said cover to open position.

3. A holder as defined in claim 2 including resilient cushioning means on an inner face of said cover adapted to bear against a film cartridge in said compartment, when said cover is closed.

4. A film cartridge holder for a projection machine, comprising: wall means defining an open, cartridge-receiving compartment; a movable cover for closing said open compartment; a movable latch for holding said cover in closed position; means biasing said latch to cover holding position; operating means automatically operable in respose to a predetermined function of said projection machine for retracting said latch from cover holding position; a manually operable member, movable independently of said latch, and having a portion engageable with said latch for manually retracting the same from cover holding position when moved to a release position; and blocking means responsive to the presence of a film cartridge in said compartment for preventing movement of said manually operable member to said release position.

5. A holder as defined in claim 4 including a normally open switch adjacent said latch; said latch having means for closing said switch when said latch is moved to cover holding position, whereby to condition a starting circuit for said projection machine.

6. A holder as defined in claim 4 including means enclosing said latch and operating means to render them inaccessible for direct manual operation.

7. A holder as defined in claim 4 wherein said blocking means comprises an opening in a side wall of said compartment and a projection on said manually operable member movable into said compartment through said opening when said member is moved toward said release position whereby engagement of said projection with a cartridge in said compartment will prevent movement of said member to said release position.

8. A holder as defined in claim 7 wherein said latch and member are separately pivotally mounted about a common axis outside of but adjacent said wall means; said latch having an abutment thereon releasably engageable by a portion of said member; said member comprising a lever pivoted intermediate its ends about said axis, one end of said lever defining manually engageable means and the other end thereof comprising said projection.

References Cited

UNITED STATES PATENTS

| | | | |
|---|---|---|---|
| 2,912,899 | 11/1959 | Wangerin et al. | 352—72 |
| 3,175,222 | 3/1965 | Nerwin | 352—72 |
| 3,282,185 | 11/1966 | Engelsmann et al. | 352—72 |

NORTON ANSHER, *Primary Examiner.*

CHARLES B. FUNK, *Assistant Examiner.*

U.S. Cl. X.R.

352—78